United States Patent
Wang et al.

(10) Patent No.: US 11,129,211 B2
(45) Date of Patent: Sep. 21, 2021

(54) CORE NETWORK DEVICE SELECTION METHOD AND APPARATUS

(71) Applicant: Huawei Technologies Co., Ltd., Shenzhen (CN)

(72) Inventors: Yuan Wang, Shanghai (CN); Fenqin Zhu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 24 days.

(21) Appl. No.: 16/577,878

(22) Filed: Sep. 20, 2019

(65) Prior Publication Data

US 2020/0015290 A1  Jan. 9, 2020

Related U.S. Application Data

(63) Continuation of application No. PCT/CN2017/077586, filed on Mar. 21, 2017.

(51) Int. Cl.
*H04W 76/10* (2018.01)
*H04W 16/02* (2009.01)

(52) U.S. Cl.
CPC ........... *H04W 76/10* (2018.02); *H04W 16/02* (2013.01)

(58) Field of Classification Search
CPC .............................. H04W 76/10; H04W 16/02
(Continued)

(56) References Cited

U.S. PATENT DOCUMENTS 10,447,824 B2 * 10/2019 Suthar .................. H04W 76/28
2010/0323695 A1  12/2010 Kallio et al.
(Continued)

FOREIGN PATENT DOCUMENTS

CN  105379354 A  3/2016
CN  106060900 A  10/2016
(Continued)

OTHER PUBLICATIONS

"3rd Generation Partnership Project; Technical Specification Group Services and System Aspects; Enhancements of Dedicated Core Networks selection mechanism (Release 14)", 3GPP TR 23. 711 V0.3.0 (Jan. 2016), 32 pages.
Huawei et al., "Update of Solution 6.1.1: The required identities for network slice selection", 3GPP TSG SA WG2 Meeting #116 Bis, S2-164524, Aug. 29-Sep. 3, 2016, Sanya, P.R of China, 10 pages.
3GPP TS 23.501 V0.3.1 (Mar. 2017), 3rd Generation Partnership Project; Technical Specification Group Services and System Aspects; System Architecture for the 5G System; Stage 2 (Release 15), Mar. 2017, 97 pages.
(Continued)

*Primary Examiner* — Mong-Thuy T Tran
(74) *Attorney, Agent, or Firm* — Slater Matsil, LLP

(57) ABSTRACT

A core network device selection method and apparatus are disclosed. The method includes: receiving, by an access network node, an access stratum message sent by a terminal, where the access stratum message includes a NAS request message and a network selection auxiliary parameter; querying configuration information based on the network selection auxiliary parameter, and determining a group identifier of at least one mobility management device group, where the configuration information includes a correspondence between a network selection auxiliary parameter and a group identifier of a mobility management device group; determining a device identifier of a target mobility management device based on the group identifier of the at least one mobility management device group; and sending the NAS request message to a mobility management device indicated by the device identifier of the target mobility management device.

20 Claims, 8 Drawing Sheets

---

Step 300: An access network node receives an RRC message sent by a terminal, where the RRC message includes a NAS request message and a network selection auxiliary parameter Step 310: The access network node queries configuration information based on the network selection auxiliary parameter, and determines a group identifier of at least one mobility management device group, where the configuration information includes a correspondence between a network selection auxiliary parameter and a group identifier of a mobility management device group Step 320: The access network node determines a device identifier of a target mobility management device based on the group identifier of the at least one mobility management device group Step 330: The access network node sends the NAS request message to a mobility management device indicated by the device identifier of the target mobility management device

(58) Field of Classification Search
USPC .................................................. 370/329, 328
See application file for complete search history.

(56) References Cited

U.S. PATENT DOCUMENTS

| 2011/0122779 | A1 | 5/2011 | Meirosu et al. | |
| 2014/0086177 | A1* | 3/2014 | Adjakple | H04L 67/10 370/329 |
| 2015/0189516 | A1* | 7/2015 | Seo | H04W 36/0009 370/329 |
| 2017/0070892 | A1 | 3/2017 | Song et al. | |
| 2017/0142591 | A1* | 5/2017 | Vrzic | H04L 47/2408 |
| 2017/0311290 | A1* | 10/2017 | Adjakple | H04W 76/10 |
| 2017/0374613 | A1* | 12/2017 | Ianev | H04W 40/04 |
| 2018/0262913 | A1* | 9/2018 | Ravishankar | H04W 16/02 |
| 2019/0021047 | A1* | 1/2019 | Zong | H04W 8/26 |

FOREIGN PATENT DOCUMENTS

| CN | 106375987 | A | 2/2017 |
| CN | 106412905 | A | 2/2017 |
| JP | 2013207594 | A | 10/2013 |
| WO | 2011062542 | A1 | 5/2011 |
| WO | 2017018663 | A1 | 2/2017 |

OTHER PUBLICATIONS

3GPP TS 23.502 V0.2.0 (Feb. 2017), 3rd Generation Partnership Project; Technical Specification Group Services and System Aspects; Procedures for the 5G System; Stage 2 (Release 15), Feb. 2017, 71 pages.

Ying, Z. et al., "Research on Internet of Things' Integration with Mobile Communication Network", Designing Techniques of Posts and Telecommunications, Jun. 21, 2011, 5 pages.

Zhang, C., "TD-LTE Evolved Packet Core Technical Analysis", Mobile Communications, Aug. 2013, 7 pages.

Catt, "Solution #4: Solution Evaluation", SA WG2 Meeting #113, S2-160362, Saint Kitts, KN, Jan. 25-29, 2016, 2 pages.

Qualcomm Inc., "Clarification on usage of default standardized or PLMN specific DCN-ID", SA WG2 Meeting #116, S2-163587, Jul. 11-15, 2016, Vienna, Austria, 4 pages.

Nokia et al., "eDECOR", 3GPP TSG-RAN WG2 Meeting #97, R2-1701953, Athens, Greece, Feb. 13-17, 2017, 3 pages.

* cited by examiner

CORE NETWORK DEVICE SELECTION METHOD AND APPARATUS

CROSS-REFERENCE TO RELATED APPLICATIONS

This application is a continuation of International Application No. PCT/CN2017/077586, filed on Mar. 21, 2017, the disclosure of which is hereby incorporated by reference in its entirety.

TECHNICAL FIELD

This application relates to the field of communications technologies, and in particular, to a core network device selection method and apparatus.

BACKGROUND

In a future communications system, a same set of physical devices of a core network in a network may be sliced into a plurality of logical core network slice instances by using a slicing technology, and each core network slice instance may be customized based on a specific business scenario or user requirement, so as to meet diverse services, and ensure mutual isolation between network slice instances. Therefore, an operator may customize different network slice instances by freely and flexibly combining network performance indicators, such as a rate, a capacity, coverage, a delay, reliability, security, and availability, so as to meet a specific requirement of each service.

In a current technology, a plurality of dedicated core networks (DCN) are deployed in a network, and the dedicated core networks refer to the foregoing core network slice instances. Each DCN serves a type of or a group of users. In the network, a usage type is defined for each user belonging to the type of or the group of users. As shown in FIG. 1, the following steps are included.

Step 101: An eNB sends a NAS request message of UE to an MME 1.

Step 102: The MME 1 queries, an HSS based on a usage type of the UE, whether the MME 1 can provide a service for the UE.

Step 103: The HSS returns a query result to the MME 1, where the query result indicates that the MME 1 cannot provide a service for the UE, and carries identifier information of an MME that can provide a service for the UE, which is an MME 2.

Step 104: The MME 2 sends a redirection instruction to the eNB, where the redirection instruction carries the identifier information of the MME 2.

Step 105: The eNB sends the NAS request of a terminal to the MME 2 based on the identifier information of the MME 2.

Therefore, when the terminal accesses a dedicated core network by using a radio access network node, the dedicated core network determines, based on a usage type of the terminal, a dedicated core network that can serve the terminal. If the dedicated core network that can serve the terminal is the dedicated core network itself, the dedicated core network continues to provide a service for the terminal. Alternatively, if the dedicated core network that can serve the terminal is not the dedicated core network itself, the dedicated core network notifies the radio access network node of an identifier of a correct dedicated core network, and the radio access network node forwards an access request of the terminal to the correct dedicated core network.

In the current technology, after the terminal accesses the dedicated core network, the dedicated core network needs to determine whether the accessed dedicated core network is correct. When the accessed dedicated core network is incorrect, the access request of the terminal is forwarded to the correct dedicated core network by using a redirection process. Therefore, extra signaling overheads are generated, and an increase in an access delay is caused.

SUMMARY

Embodiments of this application provide a core network device selection method and apparatus, to resolve problems of extra signaling overheads and an increase in an access delay of a terminal that are caused by a redirection process.

According to a first aspect, an embodiment of this application provides a core network device selection method. The method includes: receiving, by an access network node, an access stratum message sent by a terminal, where the access stratum message includes a NAS request message and a network selection auxiliary parameter; querying, by the access network node, configuration information based on the network selection auxiliary parameter, and determining a group identifier of at least one mobility management device group; determining a device identifier of a target mobility management device based on the group identifier of the at least one mobility management device group, where the configuration information includes a correspondence between a network selection auxiliary parameter and a group identifier of a mobility management device group; and sending, by the access network node, the NAS request message to a mobility management device indicated by the device identifier of the target mobility management device. Therefore, based on the method provided in this embodiment of this application, a redirection process can be effectively avoided, so that signaling interaction between network devices is reduced, and a network access delay of the terminal is reduced.

In a possible design, the network selection auxiliary parameter includes a mobility management device type, and the configuration information includes a correspondence between a mobility management device type and a group identifier of a mobility management device group; the querying, by the access network node, configuration information based on the network selection auxiliary parameter, and determining a group identifier of at least one mobility management device group includes: querying, by the access network node, the correspondence between a mobility management device type and a group identifier of a mobility management device group based on the mobility management device type, and determining the group identifier of the at least one mobility management device group. Therefore, when matching is performed for the mobility management device type, a matching success rate is relatively high, and the access network node may relatively easily select a mobility management device for the terminal.

In a possible design, the network selection auxiliary parameter includes at least one slice type, and the configuration information includes a correspondence between a slice type and a group identifier of a mobility management device group; and the querying, by the access network node, configuration information based on the network selection auxiliary parameter, and determining a group identifier of at least one mobility management device group includes: querying, by the access network node, the correspondence between a slice type and a group identifier of a mobility management device group based on the at least one slice type, and determining the group identifier of the at least one mobility management device group. Therefore, when matching is performed for the slice type, a matching success rate is relatively high, and the access network node may relatively easily select a mobility management device for the terminal.

In a possible design, the network selection auxiliary parameter includes a mobility management device type and at least one slice type; the configuration information includes a correspondence among a mobility management device type, a slice type, and a group identifier of a mobility management device group; the configuration information further includes indication information, and the indication information indicates that the access network node selects a mobility management device group based on the network selection auxiliary parameter; and the querying, by the access network node, configuration information based on the network selection auxiliary parameter, and determining a group identifier of at least one mobility management device group includes: when the indication information indicates that the access network node selects a mobility management device group based on the mobility management device type in the network selection auxiliary parameter, querying, by the access network node, a correspondence between a mobility management device type and a group identifier of a mobility management device group based on the mobility management device type, and determining the group identifier of the at least one mobility management device group; or when the indication information indicates that the access network node selects a mobility management device group based on the at least one slice type in the network selection auxiliary parameter, querying, by the access network node, a correspondence between a slice type and a group identifier of a mobility management device group based on the at least one slice type, and determining the group identifier of the at least one mobility management device group; or when the indication information indicates that the access network node selects a mobility management device group based on the mobility management device type and the at least one slice type that are in the network selection auxiliary parameter, querying, by the access network node, a correspondence between a mobility management device type and a group identifier of a mobility management device group based on the mobility management device type, and determining a group identifier of at least one mobility management device group as a first group identifier group; querying, by the access network node, a correspondence between a slice type and a group identifier of a mobility management device group based on the at least one slice type, and determining a group identifier of at least one mobility management device group as a second group identifier group; and determining, by the access network node, the group identifier of the at least one mobility management device group based on an intersection set or a union set of the first group identifier group and the second group identifier group. Therefore, the access network node determines a matching rule based on the indication information, so that a matching manner is more flexible.

In a possible design, the network selection auxiliary parameter includes a mobility management device type and at least one slice type; the configuration information includes a correspondence among a mobility management device type, a slice type, and a group identifier of a mobility management device group; and the querying, by the access network node, configuration information based on the network selection auxiliary parameter, and determining a group identifier of at least one mobility management device group includes: querying, by the access network node, a correspondence between a mobility management device type and a group identifier of a mobility management device group based on the mobility management device type, and determining a group identifier of at least one mobility management device group as a first group identifier group; querying, by the access network node, a correspondence between a slice type and a group identifier of a mobility management device group based on the at least one slice type, and determining a group identifier of at least one mobility management device group as a second group identifier group; and determining, by the access network node, the group identifier of the at least one mobility management device group based on an intersection set or a union set of the first group identifier group and the second group identifier group; or when querying a correspondence between a mobility management device type and a group identifier of a mobility management device group based on the mobility management device type, and determining a group identifier of at least one mobility management device group as a first group identifier group, skipping, by the access network node, querying a correspondence between a slice type and a group identifier of a mobility management device group based on the at least one slice type, and using a group identifier of at least one mobility management device group included in the first group identifier group as the finally determined group identifier of the at least one mobility management device group. Therefore, the access network node flexibly selects, according to a preset matching rule, one or more specific network selection auxiliary parameters based on which the configuration information is to be queried, so that a matching manner is more flexible, and matching efficiency is higher.

In a possible design, the at least one slice type includes a default slice type, and the default slice type is designated by the terminal or is set in a network configuration; and the querying, by the access network node, a correspondence between a slice type and a group identifier of a mobility management device group based on the at least one slice type, and determining the group identifier of the at least one mobility management device group includes: querying, by the access network node, the correspondence between a slice type and a group identifier of a mobility management device group based on the default slice type, and determining the group identifier of the at least one mobility management device group. Therefore, the group identifier of the mobility management device group is determined based on the default slice type, so that a basic requirement of the terminal can be effectively met, and a network access delay of the terminal is reduced.

In a possible design, the configuration information is sent by each mobility management device to the access network node, or is configured by a network management device for the access network node. Therefore, the access network node may more flexibly obtain the configuration information in a plurality of manners.

In a possible design, the determining, by the access network node, a device identifier of a target mobility management device based on the group identifier of the at least one mobility management device includes: selecting, by the access network node, a target mobility management device group from the at least one mobility management device group; and executing a NAS node selection function on each mobility management device in the target mobility management device group, and determining the device identifier of the target mobility management device. Therefore, the access network node may determine the device identifier of the target mobility management device by using the current technology, so that compatibility with the current technology is relatively desirable.

In a possible design, the configuration information further includes weight information of each mobility management device group corresponding to a mobility management device type; and the selecting, by the access network node, a target mobility management device group from the at least one mobility management device group includes: selecting, by the access network node, the target mobility management device group from the at least one mobility management device group based on the weight information of each mobility management device group, of the at least one mobility management device group, corresponding to the mobility management device type. Therefore, the access network node determines the target mobility management device group based on the weight information of each mobility management device group, of the at least one mobility management device group, corresponding to the mobility management device type, to ensure a load balance of each mobility management device group.

In a possible design, the configuration information further includes weight information of each mobility management device group corresponding to a slice type; the at least one slice type includes a default slice type, and the default slice type is designated by the terminal or is set in a network configuration; and the selecting, by the access network node, a target mobility management device group from the at least one mobility management device group includes: selecting, by the access network node, the target mobility management device group from the at least one mobility management device group based on weight information of each mobility management device group, of the at least one mobility management device group, corresponding to the default slice type. The access network node determines the target mobility management device group based on the weight information of each mobility management device group, of the at least one mobility management device group, corresponding to the default slice type, to ensure a load balance of each mobility management device group.

According to a second aspect, this application provides a core network device selection apparatus, configured to perform the method in any one of the first aspect or the possible designs of the first aspect. Specifically, the apparatus includes a unit configured to perform the method in any one of the first aspect or the possible designs of the first aspect.

According to a third aspect, this application provides an access network node, including a transceiver, a processor, and a memory. The transceiver, the processor, and the memory may be connected by using a bus system. The memory is configured to store a program, an instruction, or code, and the processor is configured to execute the program, the instruction, or the code in the memory, to complete the method in any one of the first aspect or the possible implementations of the first aspect.

According to a fourth aspect, an embodiment of the present invention provides a communications system, where the system includes the access network node in the third aspect. Optionally, the system may further include another device interacting with the access network node in the solutions provided in the embodiments of this application.

According to a fifth aspect, this application provides a computer readable storage medium, where the computer readable storage medium stores an instruction, and when the instruction runs on a computer, the computer performs the method in any one of the first aspect or the possible designs of the first aspect.

According to a sixth aspect, this application further provides a computer program product that includes an instruction. When the computer program product runs on a computer, the computer performs the methods in the foregoing aspects.

DETAILED DESCRIPTION OF ILLUSTRATIVE EMBODIMENTS

The following describes embodiments of this application with reference to accompanying drawings.

Figure 1:
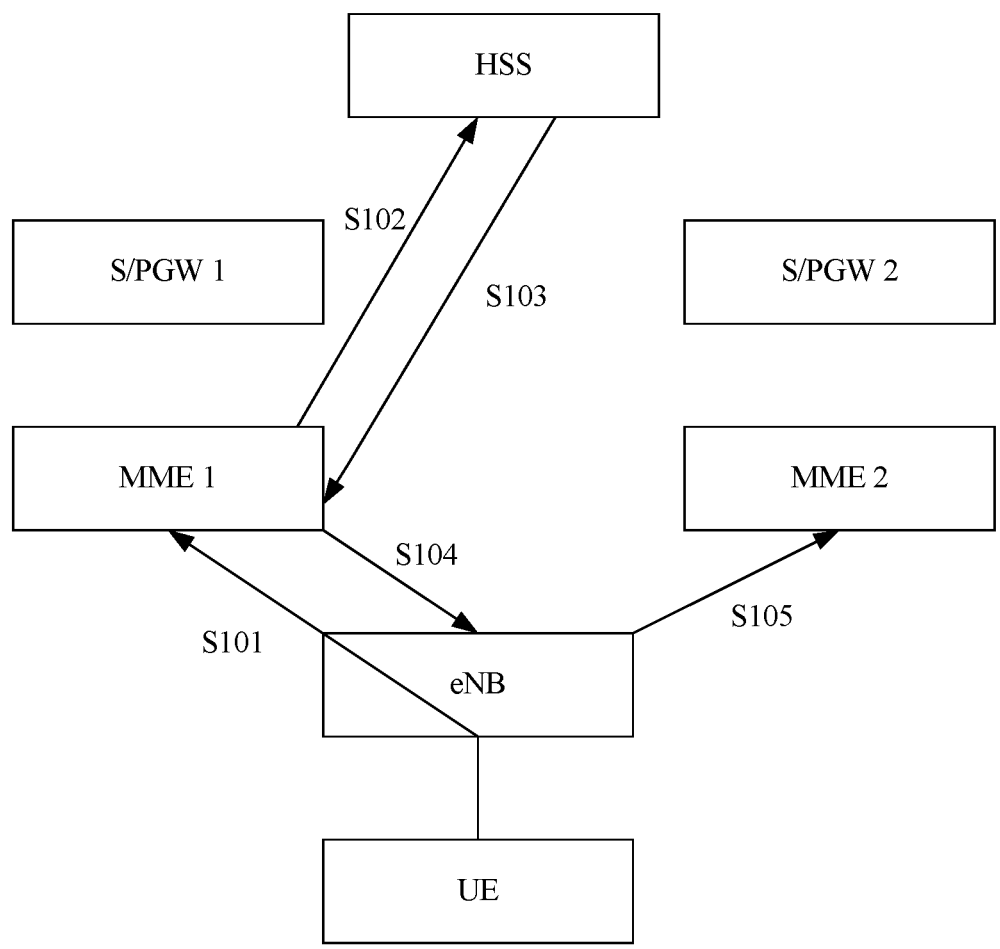
FIG. 1 is a flowchart of accessing a dedicated core network by a terminal in the background of this application.
Figure 2:
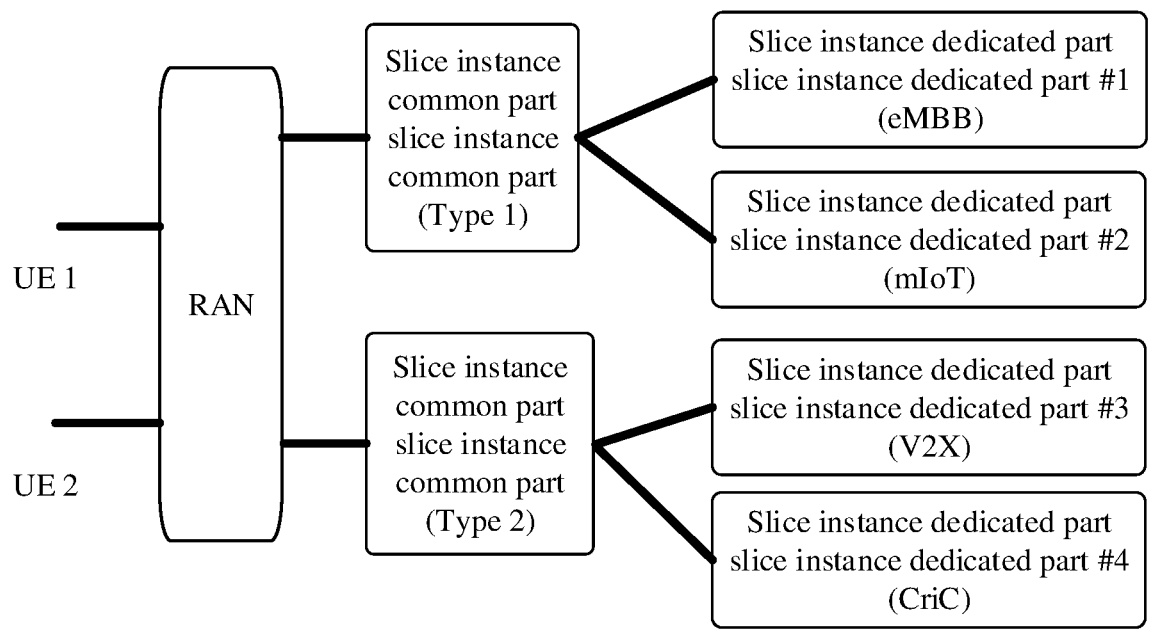
FIG. 2 is a schematic diagram of an application scenario of selecting a core network device according to an embodiment of this application.

FIG. 2 is a schematic diagram of a specific application scenario of this application. It should be known that core network slice instances in FIG. 2 are merely an example, and this application is not limited thereto.

Specifically, four core network slice instances are deployed in an operator network, and are respectively used for four business scenarios: enhanced mobile broadband (eMBB), a massive internet of things (mIoT), an information exchange from vehicle to the outside (Vehicle to X, V2X), and ultra-reliable and low latency communications (uRLLC). Core network slice instances of the eMBB and the mIoT share a control plane function that is marked as a common CP 1. Core network slice instances of the V2X and the URLLC also share a control plane function that is marked as a common CP 2. A RAN node is shared by all the core network slice instances.

Based on the application scenario in FIG. 2, when UE 1 has a service requirement for accessing both the eMBB and the mIoT, the UE 1 may first access the common CP 1 by using the RAN node; when UE 2 has a service requirement for accessing both the V2X and the URLLC, the UE 2 may first access the common CP 2 by using the RAN node.

A terminal in this application is a terminal device supporting a 5G network. However, a terminal to which this application can be applied is not limited thereto, and this application may be further applied to all types of terminal devices, including a mobile phone, an internet of things device, a smart household device, an industrial control device, a vehicle device, and the like. The RAN node in this application is an access network node, and the access network node may be a 3GPP radio access network node or a non-3GPP access point, such as a Wi-Fi access point or a fixed network access point.

In FIG. 2, a slice instance common part is a control plane device or network function shared by one or more slice instances, for example, a mobility management device or network function (MMF). A slice instance dedicated part is a control plane device or network function dedicatedly used by a core network slice instance, for example, a session management device or network function (SMF). In the embodiments of this application, for simplicity, only the MMF is used to represent the slice instance common part, and only the SMF is used to represent the slice instance dedicated part. This is not intended to limit this application.

Figure 3:
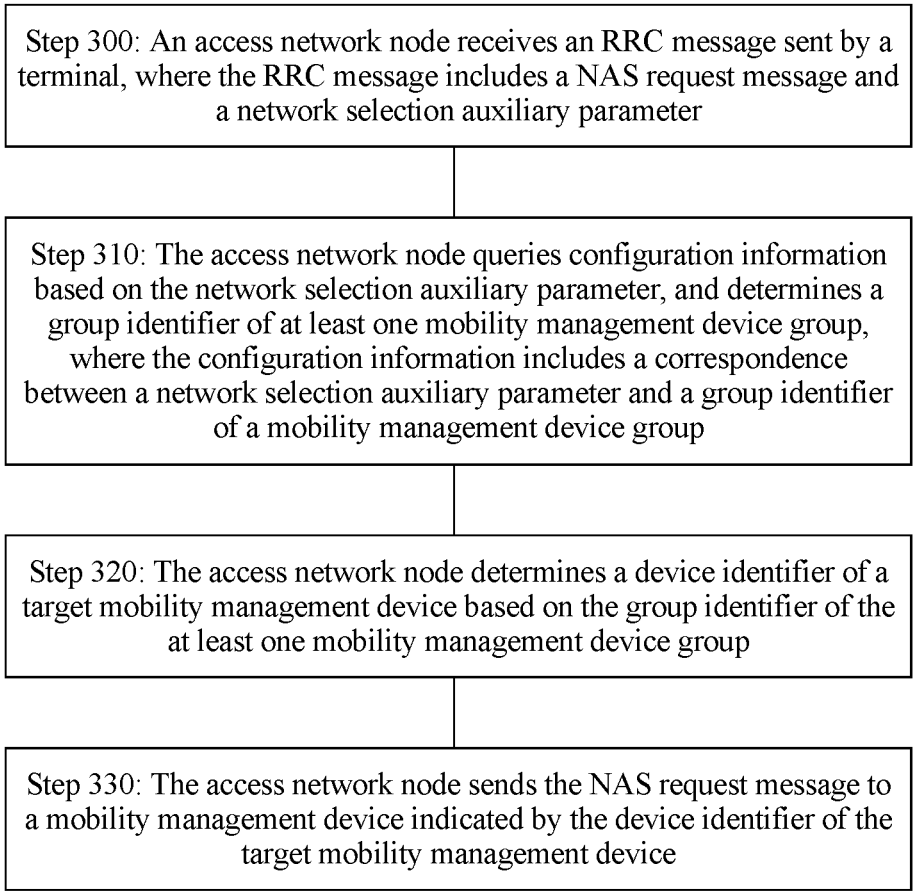
FIG. 3 is an overview flowchart of selecting a core network device according to an embodiment of this application.

As shown in FIG. 3, an embodiment of this application provides a core network device selection method. The method includes the following steps.

Step 300: An access network node receives an access stratum message sent by a terminal, where the access stratum message includes a non-access stratum (NAS) request message and a network selection auxiliary parameter; the network selection auxiliary parameter is used to instruct the access network node to select a mobility management device for the terminal.

It should be understood that the access stratum message herein may be a radio resource control (RRC) message.

Step 310: The access network node queries configuration information based on the network selection auxiliary parameter, and determines a group identifier of at least one mobility management device group, where the configuration information includes a correspondence between a network selection auxiliary parameter and a group identifier of a mobility management device group.

Step 320: The access network node determines a device identifier of a target mobility management device based on the group identifier of the at least one mobility management device group.

Step 330: The access network node sends the NAS request message to a mobility management device indicated by the device identifier of the target mobility management device.

In a possible design, before performing step 300, the access network node obtains the configuration information. Specifically, the configuration information is sent by each mobility management device to the access network node, or is configured by a network management device for the access network node.

For step 320, in a possible design, the access network node may determine the device identifier of the target mobility management device based on the group identifier of the at least one mobility management device by using the following method: the access network node selects a target mobility management device group from the at least one mobility management device group, executes a NAS node selection function on each mobility management device in the target mobility management device group, and determines the device identifier of the target mobility management device.

Specifically, each mobility management device in a mobility management device group configures weight information of the mobility management device for the access network node, and the access network node determines a mobility management device according to a load balancing rule. For example, one mobility management device group includes three mobility management devices A1, A2, and A3, and weight information of A1, A2, and A3 is respectively 10%, 60%, and 30%. Therefore, in every to NAS request messages allocated to the mobility management device group, the RAN node allocates one NAS request message to A1, six NAS request messages to A2, and three NAS request messages to A3.

It should be understood that a mobility management device type mentioned in this application is used to indicate a processing mechanism or behavior of a mobility management device, to support a function and a service provided by one or more slices, such as a type of MMF, or an AMF type. A slice type is used to indicate a processing mechanism or behavior of a network slice, to support a function and a service that are provided by the slice, such as a type of SMF, a slice type, or a service type. A group identifier of a mobility management device group may be represented by using an MMF group ID. A device identifier of a mobility management device may be represented by using an MMF instance ID. A device identifier of each mobility management device may be carried when the mobility management device sends the configuration information to the access network node, or may be carried when the network management device configures the configuration information for the access network node. In addition, the terminal may obtain the mobility management device type and/or the slice type by using the mobility management device, or the terminal configures the mobility management device type and/or the slice type in advance. It should be understood that the mobility management device mentioned in this application may also be an access and mobility management device (AMF). The mobility management device type may also be the AMF type. Correspondingly, the group identifier of the mobility management device group may be represented by using an AMF group ID, and the device identifier of the mobility management device may be represented by using an AMF instance ID.

Several possible implementations of step 310 in this embodiment of this application are described below.

In a first implementation, the network selection auxiliary parameter includes a mobility management device type, and the configuration information includes a correspondence between a mobility management device type and a group identifier of a mobility management device group.

In this case, for step 310, the access network node queries the correspondence between a mobility management device type and a group identifier of a mobility management device group based on the mobility management device type, and determines the group identifier of the at least one mobility management device group.

The correspondence between a mobility management device type and a group identifier of a mobility management device group is shown in Table 1.

TABLE 1

| (Type of MMF) eMBB + mIoT | MMF 1 group ID |
|---|---|
| (Type of MMF) V2X + URLLC | MMF 2 group ID |

For the mobility management device types in Table 1, the fields eMBB+mIoT and V2X+URLLC are provided merely for ease of understanding. During actual implementation, a value or a scalar may be used for representation. For example, the eMBB+mIoT is represented by using C001, the eMBB is represented by using D001, and the mIoT is represented by using D002. It should be understood that a plurality of pieces of information listed in Table 1 are merely examples, and do not constitute any limitation on this application.

A specific implementation procedure of the first implementation is described below by using FIG. 4 as an example.

S401: A RAN node receives configuration messages sent by an MMF 1 and an MMF 2.

Figure 4:
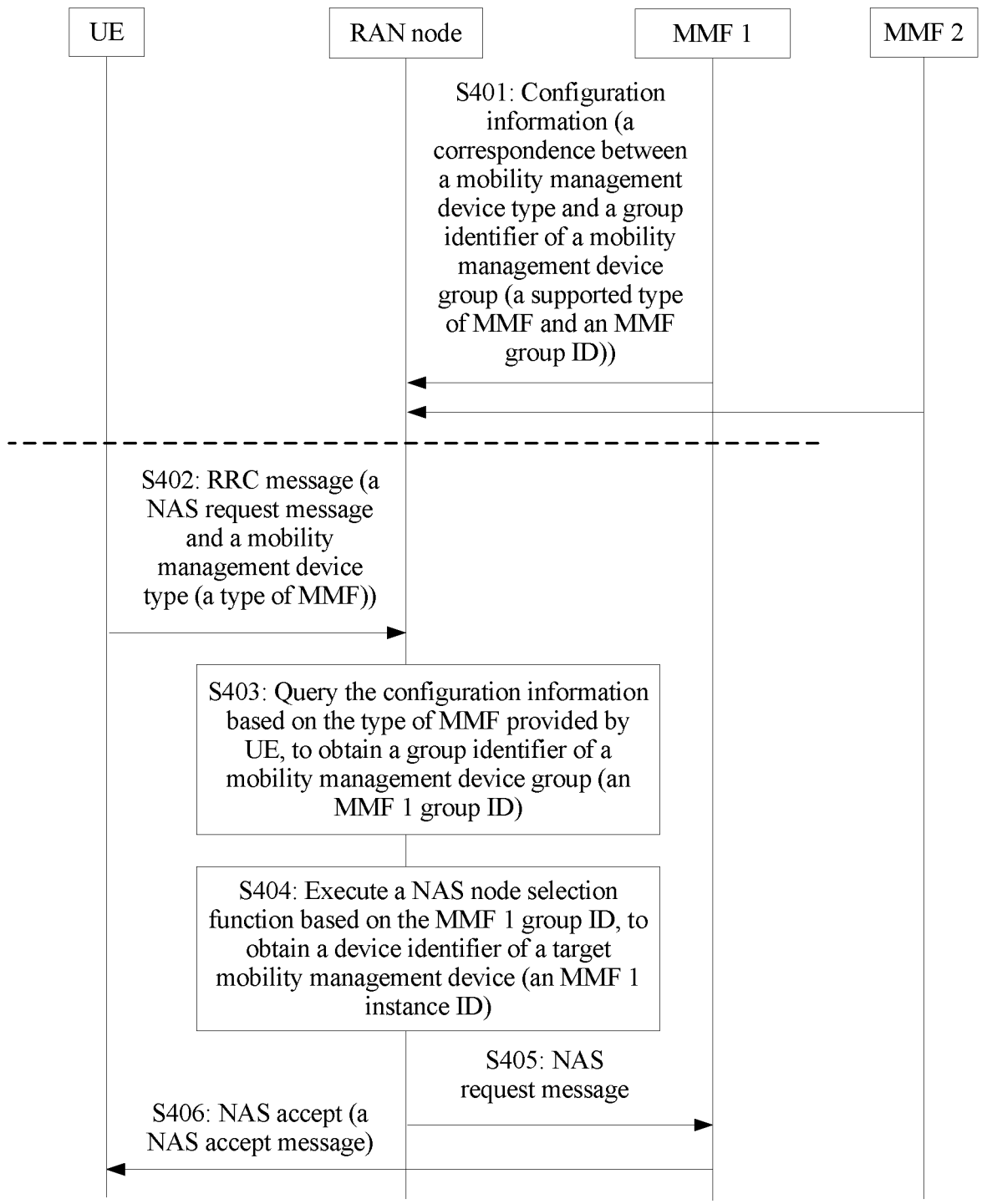
FIG. 4 is a specific flowchart of a first implementation in which an access network node determines a group identifier of at least one mobility management device group according to an embodiment of this application.

Specifically, in a process of configuring an interface between the RAN node and an MMF, as shown in FIG. 4, MMFs currently connected to the RAN node include the MMF 1 and the MMF 2, the MMF 1 and the MMF 2 send the configuration messages to the RAN node, the configuration message sent by the MMF 1 includes a correspondence between a type of MMF supported by the MMF 1 and an MMF group ID, and the configuration message sent by the MMF 2 includes a correspondence between a type of MMF supported by the MMF 2 and an MMF group ID, as shown in Table 1. It is assumed herein that an MMF 1 group includes only one mobility management device MMF 1, and an MMF 1 group includes only one mobility management device MMF 2. When the MMF 1 group includes a plurality of mobility management devices, each mobility management device in the MMF 1 group sends configuration information to the RAN node. The RAN node collects statistics about a quantity of MMFs that send same configuration information, to obtain a quantity of MMFs included in the MMF 1 group and an instance ID of each MMF. It should be known that only an example in which each MMF sends the configuration information to the RAN node is used herein for description. Alternatively, the configuration information may be configured by the network management device for the RAN node in advance.

S402: UE sends an RRC message to the RAN node, where the RRC message includes a NAS request message and a type of MMF. For example, the type of MMF is the eMBB+mIoT.

For details of S402, refer to step 300.

S403: The RAN node queries the configuration information based on the type of MMF provided by the UE, to be specific, Table 1, to obtain an MMF 1 group ID.

For details of S403, refer to the first implementation.

S404: The RAN node executes the NAS node selection function based on the MMF 1 group ID, to obtain an MMF 1 instance ID.

For details of S404, refer to step 320.

S405: The RAN node forwards the NAS request message of the UE to an MMF indicated by the MMF 1 instance ID.

For details of S405, refer to step 330.

S406: The MMF 1 sends a NAS accept (NAS accept) message to the UE, where the NAS accept message includes the type of MMF. The NAS accept message may be consistent or inconsistent with the type of MMF provided by the UE. For example, the MMF 1 needs to update the type of MMF.

It should be known that when the RAN node cannot obtain, by querying the configuration information, a matching MMF group based on the type of MMF provided by the UE, the RAN node may execute the NAS node selection function based on a default MMF group, to obtain an MMF instance ID, and forward the NAS request message of the UE to an MMF indicated by the MMF instance ID. It should be understood that the NAS node selection function is consistent with a NAS node selection function in the prior art, and repeated content is not described.

In addition, the network selection auxiliary parameter in this case may further include at least one slice type, and the configuration information further includes a correspondence between a slice type and a group identifier of a mobility management device group. When the RAN node cannot obtain, by querying the configuration information, a matching MMF group based on the type of MMF provided by the UE, the RAN node may query the correspondence between a slice type and a group identifier of a mobility management device group based on the at least one slice type, and determine the group identifier of the at least one mobility management device group. For details, refer to a second implementation.

Further, in a possible design, the configuration information further includes weight information of each mobility management device group corresponding to a mobility management device type. In this case, the access network node may select the target mobility management device group from the at least one mobility management device group by using the following method: the access network node selects the target mobility management device group from the at least one mobility management device group based on the weight information of each mobility management device group, of the at least one mobility management device group, corresponding to the mobility management device type.

For example, three determined mobility management device groups are respectively G1, G2, and G3. The three mobility management devices groups have a same type. Weight information of G1, G2, and G3 corresponding to the mobility management device type is respectively 20%, 50%, and 30%. Therefore, in every to NAS request messages allocated to the type of mobility management device groups, the RAN node allocates two NAS request messages to G1, five NAS request messages to G2, and three NAS request messages to G3.

In a second implementation, the network selection auxiliary parameter includes at least one slice type, and the configuration information includes a correspondence between a slice type and a group identifier of a mobility management device group.

In this case, for step 310, the access network node queries the correspondence between a slice type and a group identifier of a mobility management device group based on the at least one slice type, and determines the group identifier of the at least one mobility management device group.

The correspondence between a slice type and a group identifier and a mobility management device group is shown in Table 2.

TABLE 2

| (Type of SMF #1) eMBB | MMF 1 group ID |
|---|---|
| (Type of SMF #2) mIoT | |
| (Type of SMF #3) V2X | MMF 2 group ID |
| (Type of SMF #4) URLLC | |

It should be understood that a plurality of pieces of information listed in Table 2 are merely examples, and do not constitute any limitation on this application.

In the embodiment shown in FIG. 4, the RAN node selects the MMF for the UE based on the type of MMF. However, in some cases, for example, in a roaming scenario or an inter-provincial scenario, an operator is very unlikely to deploy this common type of MMF. In this way, the RAN node cannot perform selection based on the type of MMF. In this case, the MMF can be selected for the terminal by using an embodiment in FIG. 5.

A specific implementation procedure of the second implementation is described below by using FIG. 5 as an example.

S501: A RAN node receives configuration messages sent by an MMF 1 and an MMF 2.

Figure 5:
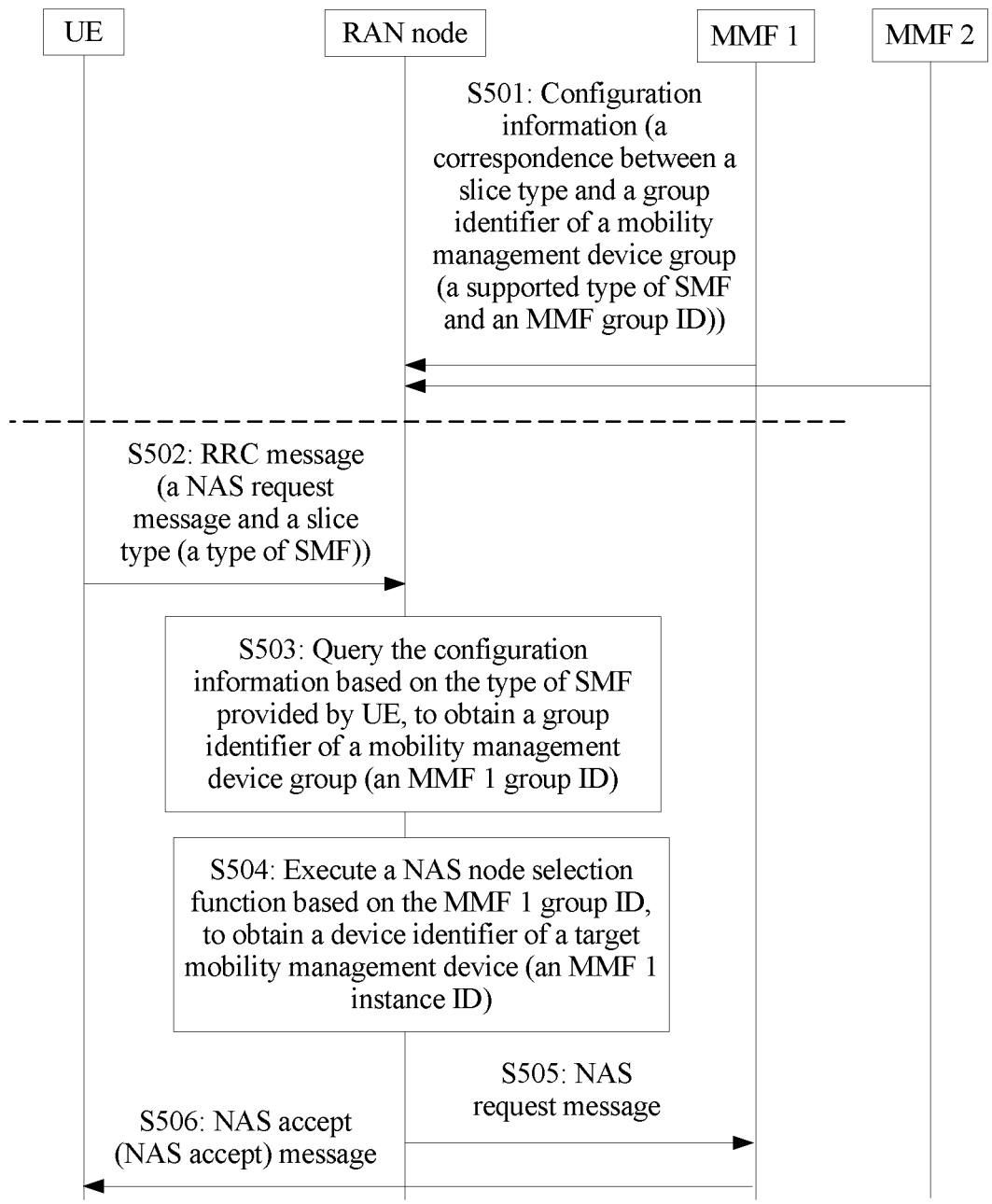
FIG. 5 is a specific flowchart of a second implementation in which an access network node determines a group identifier of at least one mobility management device group according to an embodiment of this application.

Specifically, in a process of configuring an interface between the RAN node and an MMF, as shown in FIG. 5, MMFs currently connected to the RAN node include the MMF 1 and the MMF 2, the MMF 1 and the MMF 2 send the configuration messages to the RAN node, the configuration message sent by the MMF 1 includes a correspondence between a type of SMF supported by the MMF 1 and an MMF group ID, and the configuration message sent by the MMF 2 includes a correspondence between a type of SMF supported by the MMF 2 and an MMF group ID, as shown in Table 2. It should be known that only an example in which each MMF sends the configuration information to the RAN node is used herein for description. Alternatively, the configuration information may be configured by the network management device for the RAN node in advance.

S502: UE sends an RRC message to the RAN node, where the RRC message includes a NAS request message and a type of SMF. For example, the type of SMF is the eMBB.

For details of S502, refer to step 300.

S503: The RAN node queries the configuration information based on the type of SMF provided by the UE, to be specific, Table 2, to obtain an MMF 1 group ID.

For details of S503, refer to the second implementation.

S504: The RAN node executes the NAS node selection function based on the MMF 1 group ID, to obtain an MMF 1 instance ID.

For details of S504, refer to step 320.

S505: The RAN node forwards the NAS request message of the UE to an MMF indicated by the MMF 1 instance ID.

For details of S505, refer to step 330.

S506: The MMF 1 sends a NAS accept message to the UE, where the NAS accept message includes the type of MMF.

Therefore, the UE may obtain the mobility management device type by using S506, and when the UE sends the access stratum message to the RAN node next time, the RRC message may include the NAS request message and the type of MMF.

In addition, the network selection auxiliary parameter in this case may further include the mobility management device type, and the configuration information includes a correspondence between a mobility management device type and a group identifier of a mobility management device group. When the RAN node cannot obtain, by querying the configuration information, a matching MMF group based on the type of SMF provided by the UE, the RAN node may query the correspondence between a mobility management device type and a group identifier of a mobility management device group based on the mobility management device type, and determine the group identifier of the at least one mobility management device group. For details, refer to the first implementation.

Further, in a possible design, the at least one slice type includes a default slice type, and the default slice type is designated by the terminal or is set in a network configuration. For step 310, the access network node queries the correspondence between a slice type and a group identifier of a mobility management device group based on the default slice type, and determines the group identifier of the at least one mobility management device group. In this case, considering that a requirement of the terminal for accessing a slice of the default slice type needs to be met first, the group identifier of the at least one mobility management device group is determined for the terminal based on the default slice type.

For example, the UE sends an RRC message to the RAN node, and the RRC message includes a NAS request message and a type of SMF. The type of SMF includes the eMBB and the V2X, and the eMBB is the default slice type. Because an operator may not deploy the common type of MMF: eMBB+V2X, in this case, the access network node may not find an MMF supporting both the eMBB and the V2X. Therefore, when the eMBB is the default slice type, the access network node may query the correspondence between a slice type and a group identifier of a mobility management device group based on the eMBB, and determine the group identifier of the at least one mobility management device group. The eMBB being the default slice type herein may be designated by the terminal or set in a network configuration.

In addition, in a possible design, the configuration information further includes weight information of each mobility management device group corresponding to a slice type. In this case, when selecting the target mobility management device group from the at least one mobility management device group, the access network node may select the target mobility management device group from the at least one mobility management device group based on weight information of each mobility management device group, of the at least one mobility management device group, corresponding to the default slice type.

Figure 6:
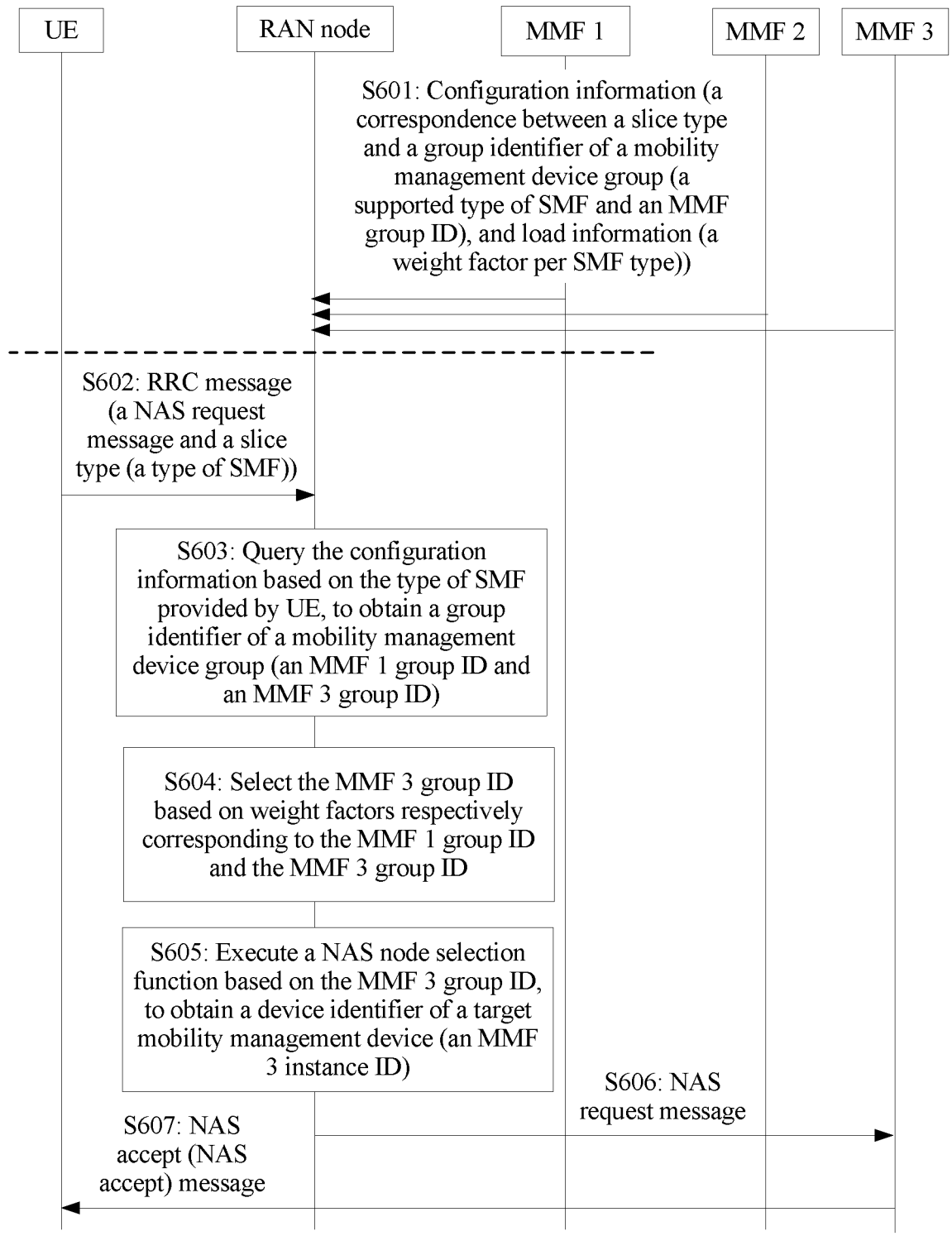
FIG. 6 is a specific flowchart of determining a target mobility management device group when configuration information includes weight information of each mobility management device group corresponding to a slice type according to an embodiment of this application.

FIG. 6 describes how to determine the target mobility management device group when the configuration information further includes the weight information of each mobility management device group corresponding to the slice type.

S601: A RAN node receives configuration messages sent by an MMF 1, an MMF 2, and an MMF 3, as shown in Table 3. In addition, configuration information sent by each MMF further includes weight information of the MMF corresponding to a slice type, for example, load information (Weight Factor per SMF type) in FIG. 6.

TABLE 3

| | |
|---|---|
| (Type of SMF #1) eMBB | MMF 1 group ID |
| (Type of SMF #2) mIoT | |
| (Type of SMF #3) V2X | MMF 2 group ID |
| (Type of SMF #4) URLLC | |
| (Type of SMF #5) eMBB | MMF 3 group ID |
| (Type of SMF#6) V2X | |

S602: UE sends an RRC message to the RAN node, where the RRC message includes a NAS request message and a type of SMF. For example, the type of SMF is the eMBB.

For details of S602, refer to step 300.

S603: The RAN node queries the configuration information based on the type of SMF provided by the UE, to be specific, Table 3, to obtain an MMF 1 group ID and an MMF 3 group ID.

For details of S603, refer to step 310.

S604: The RAN node selects the MMF 3 group ID based on weight information of the MMF 1 group ID and the MMF 3 group ID separately corresponding to the eMBB, to be specific, weight factors.

Specifically, assuming that the MMF 1 sets a weight factor of the eMBB to 3, and the MMF 2 sets a weight factor of the eMBB to 7, the RAN node hands eMBB services accounting for 30% of the total over to the MMF 1 for processing, and hands eMBB services accounting for 70% of the total over to the MMF 3 for processing.

S605: The RAN node executes the NAS node selection function based on the MMF 3 group ID, to obtain an MMF 3 instance ID.

For details of S604 and 3605, refer to step 320.

S606: The RAN node forwards the NAS request message of the UE to an MMF indicated by the MMF 3 instance ID.

For details of S606, refer to step 330.

S607: The MMF 3 sends a NAS accept message to the UE, where the NAS accept message includes the type of MMF.

In the foregoing embodiment, the type of SMF includes a slice type, and the slice type may be directly used as a default slice type. Alternatively, when the type of SMF includes a plurality of slice types, a default slice type needs to be determined. The type of SMF includes the eMBB and the URLLC, Table 3 is queried based on the eMBB to obtain the MMF 1 group ID and the MMF 3 group ID, and Table 3 is queried based on the URLLC to obtain the MMF 2 group ID. When the eMBB is the default slice type, the MMF is determined by using the method shown in FIG. 6. When the URLLC is the default slice type, the RAN node executes the NAS node selection function based on the MMF 2 group ID, to obtain the device identifier of the target mobility management device. Alternatively, because the type of SMF includes the eMBB and the URLLC, Table 3 is first queried based on the default slice type to determine the group identifier of the at least one mobility management device group, and then a group identifier of the target mobility management device group is further determined by using the method shown in FIG. 6.

In a third implementation, the network selection auxiliary parameter includes a mobility management device type and at least one slice type; the configuration information includes a correspondence among a mobility management device type, a slice type, and a group identifier of a mobility management device group; the configuration information further includes indication information, and the indication information indicates that the access network node selects a mobility management device group based on the network selection auxiliary parameter.

It should be understood that the configuration information herein may include the correspondence among a mobility management device type, a slice type, and a group identifier of a mobility management device group, or the configuration information herein may include a correspondence between a mobility management device type and a group identifier of a mobility management device group, and a correspondence between a slice type and a group identifier of a mobility management device group.

Three specific cases may be included herein based on different indication information.

In a first case, when the indication information indicates that the access network node selects a mobility management device group based on the mobility management device type in the network selection auxiliary parameter, the access network node queries the correspondence between a mobility management device type and a group identifier of a mobility management device group based on the mobility management device type, and determines the group identifier of the at least one mobility management device group.

A specific implementation method of the first case is consistent with the first implementation.

In a second case, when the indication information indicates that the access network node selects a mobility management device group based on the at least one slice type in the network selection auxiliary parameter, the access network node queries the correspondence between a slice type and a group identifier of a mobility management device group based on the at least one slice type, and determines the group identifier of the at least one mobility management device group.

A specific implementation method of the second case is consistent with the second implementation.

In a third case, when the indication information indicates that the access network node selects a mobility management device group based on the mobility management device type and the at least one slice type that are in the network selection auxiliary parameter, the access network node queries the correspondence between a mobility management device type and a group identifier of a mobility management device group based on the mobility management device type, and determines a group identifier of at least one mobility management device group as a first group identifier group; the access network node queries the correspondence between a slice type and a group identifier of a mobility management device group based on the at least one slice type, and determines a group identifier of at least one mobility management device group as a second group identifier group; the access network node determines the group identifier of the at least one mobility management device group based on an intersection set or a union set of the first group identifier group and the second group identifier group.

It should be known that, in the third case, an order in which the access network node determines the first group identifier group and the second group identifier group is not limited.

TABLE 4

| | | |
|---|---|---|
| (Type of MMF) eMBB + mIoT | (Type of SMF #1) eMBB (Type of SMF #2) mIoT | MMF 1 group ID |
| (Type of MMF) V2X + URLLC | (Type of SMF #3) V2X (Type of SMF #4) URLLC | MMF 2 group ID |
| (Type of MMF) eMBB + V2X | (Type of SMF #5) eMBB (Type of SMF #6) V2X | MMF 3 group ID |

As shown in Table 4, the configuration information includes the correspondence among a mobility management device type, a slice type, and a group identifier of a mobility management device group.

For example, the UE sends an RRC message to the RAN node, and the RRC message includes a NAS request message, a type of SMF, and a type of MMF. The type of MMF is the eMBB+mIoT, and the type of SMF is the eMBB. When the indication information indicates that the access network node selects a mobility management device group based on the mobility management device type and the at least one slice type that are in the network selection auxiliary parameter, the RAN node queries the configuration information based on the type of SMF provided by the UE, to be specific, Table 4, to obtain the MMF 1 group ID and the MMF 3 group ID. The RAN node queries Table 4 based on the type of MMF provided by the UE, to obtain the MMF 1 group ID. The RAN node obtains an intersection set based on the query result, and determines the MMF 1 group ID as an MMF group with a highest matching degree.

For another example, the UE sends an RRC message to the RAN node, and the RRC message includes a NAS request message, a type of SMF, and a type of MMF. The type of MMF is the eMBB, and the type of SMF is the eMBB. When the indication information indicates that the access network node selects a mobility management device group based on the mobility management device type and the at least one slice type that are in the network selection auxiliary parameter, the RAN node queries the configuration information based on the type of SMF provided by the UE, to be specific, Table 4, to obtain the MMF 1 group ID and the MMF 3 group ID. The RAN node queries Table 4 based on the type of MMF provided by the UE, and cannot obtain a suitable MMF group through matching, because during actual application, each type of MMF is usually represented by using a value or a scalar, a defined value of the eMBB+ mIoT is 003, and a defined value of the eMBB is 002. In this case, the RAN node obtains no intersection set based on the foregoing query result, obtains a union set based on the query result, and determines that the MMF 1 group ID and the MMF 3 group ID are MMF groups with a highest matching degree. Further, if the configuration information further includes the weight information of each mobility management device group corresponding to the slice type, the access network node selects the target mobility management device group from the at least one mobility management device group.

It should be understood that the indication information may alternatively be configured on the RAN node by default, the RAN node performs the foregoing procedure according to a default configuration rule, and configuration information sent by each MMF does not need to include an indication.

Figure 7:
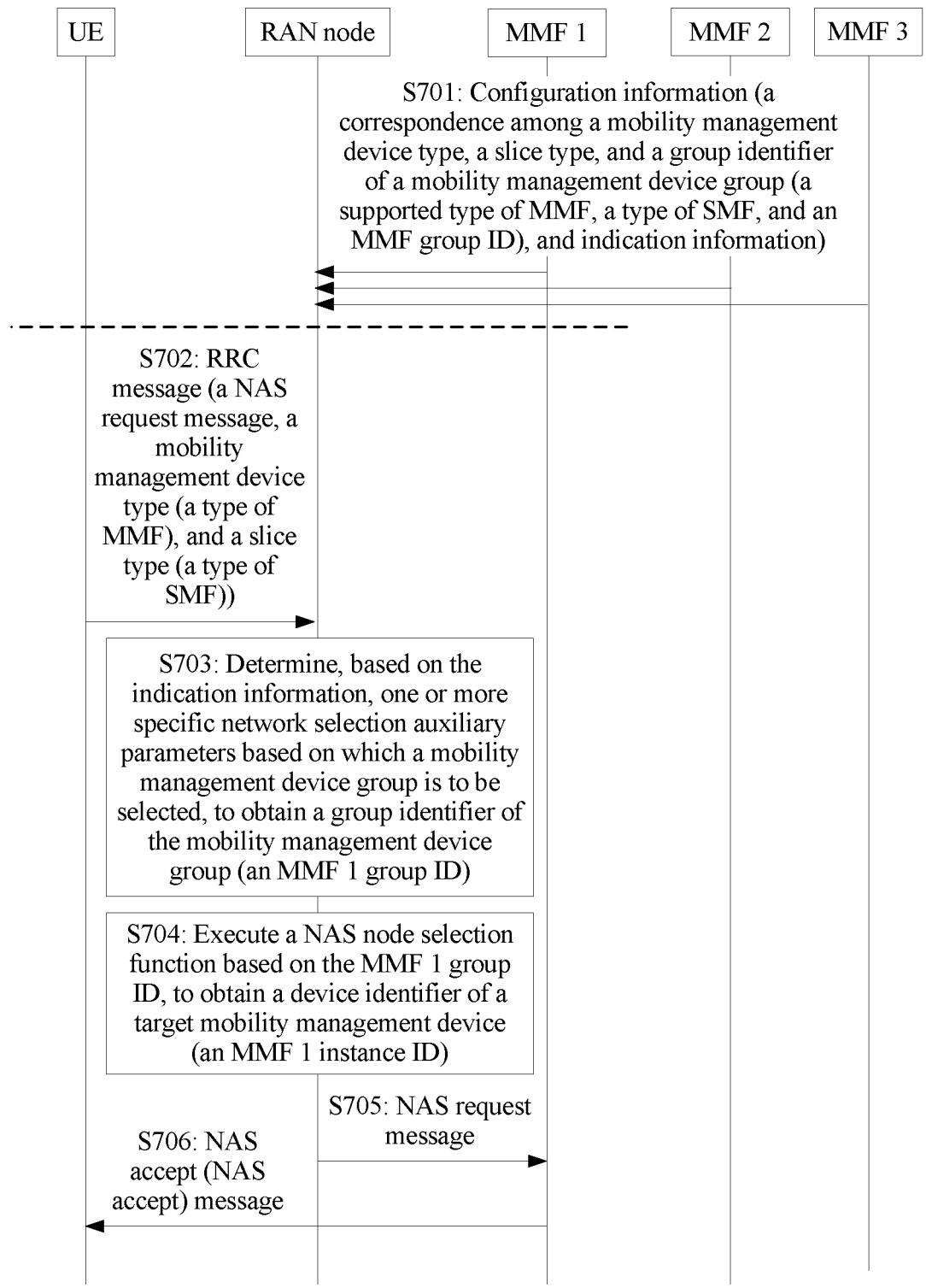
FIG. 7 is a specific flowchart of a third implementation in which an access network node determines a group identifier of at least one mobility management device group according to an embodiment of this application.

A specific implementation procedure of the third implementation is described below by using FIG. 7 as an example.

S701: A RAN node receives configuration messages sent by an MMF 1, an MMF 2, and an MMF 3, as shown in Table 4. In addition, each piece of configuration information further includes same indication information.

S702: UE sends an RRC message to the RAN node, where the RRC message includes a NAS request message, a type of SMF, and a type of MMF. For example, the type of MMF is the eMBB+mIoT, and the type of SMF is the eMBB.

For details of S702, refer to step 300.

S703: The RAN node determines, based on the indication information, one or more specific network selection auxiliary parameters based on which a mobility management device group is to be selected, to obtain an MMF 1 group ID.

For details, refer to the third implementation.

For example, when the indication information indicates that the RAN node selects the mobility management device group based on the type of MMF, the RAN node queries Table 4, to obtain the MMF 1 group ID.

For another example, when the indication information indicates that the RAN node selects the mobility management device group based on the type of SMF, the RAN node queries Table 4, to obtain the MMF 1 group ID and the MMF 3 group ID.

For another example, when the indication information indicates that the RAN node selects the mobility management device group based on the type of SMF and the type of MMF, the RAN node queries Table 4, the first group identifier group includes the MMF 1 group ID, the second group identifier group includes the MMF 1 group ID and the MMF 3 group ID, and the RAN node obtains the intersection set of the first group identifier group and the second group identifier group, to obtain the MMF 1 group ID, or obtains the union set of the first group identifier group and the second group identifier group, to obtain the MMF 1 group ID and the MMF 3 group ID.

It should be known that only the finally determined MMF 1 group ID is used as an example herein for description. The MMF 3 group ID may be further used as an example for description.

S704: The RAN node executes the NAS node selection function based on the MMF 1 group ID, to obtain an MMF 1 instance ID.

For details of S704, refer to step 320.

S705: The RAN node forwards the NAS request message of the UE to an MMF indicated by the MMF 1 instance ID.

For details of S705, refer to step 330.

S706: The MMF 1 sends a NAS accept message to the UE, where the NAS accept message includes the type of MMF.

In a fourth implementation, the network selection auxiliary parameter includes a mobility management device type and at least one slice type; the configuration information includes a correspondence among a mobility management device type, a slice type, and a group identifier of a mobility management device group.

In this case, step 310 may specifically include the following two cases.

In a first case, the access network node queries a correspondence between a mobility management device type and a group identifier of a mobility management device group based on the mobility management device type, and determines a group identifier of at least one mobility management device group as a first group identifier group; the access network node queries a correspondence between a slice type and a group identifier of a mobility management device group based on the at least one slice type, and determines a group identifier of at least one mobility management device group as a second group identifier group; and the access network node determines the group identifier of the at least one mobility management device group based on an intersection set or a union set of the first group identifier group and the second group identifier group.

A specific implementation method of the first case is consistent with the third case in the third implementation, but an MMF does not need to send indication information.

In a second case, when querying a correspondence between a mobility management device type and a group identifier of a mobility management device group based on the mobility management device type, and determining a group identifier of at least one mobility management device group as a first group identifier group, the access network node skips querying a correspondence between a slice type and a group identifier of a mobility management device group based on the at least one slice type, and uses a group identifier of at least one mobility management device group included in the first group identifier group as the finally determined group identifier of the at least one mobility management device group.

Therefore, the access network node may first query the correspondence between a mobility management device type and a group identifier of a mobility management device group based on the mobility management device type, and if the access network node obtains the group identifier of the at least one mobility management device group through querying, does not need to further query the correspondence between a slice type and a group identifier of a mobility management device group based on the at least one slice type. Therefore, a matching manner is more convenient and more flexible, and matching efficiency is higher.

It should be understood that the access network node may alternatively first query the correspondence between a slice type and a group identifier of a mobility management device group based on the at least one slice type, and if the access network node obtains the group identifier of the at least one mobility management device group through querying, does not need to further query the correspondence between a mobility management device type and a group identifier of a mobility management device group based on the mobility management device type. Therefore, whether to first perform matching for the mobility management device type or the slice type may be flexibly configured depending on an actual network requirement.

Based on a same concept, this application further provides a core network device selection apparatus. The apparatus may be configured to perform the steps performed by the access network node in FIG. 3. Therefore, for implementations of the core network device selection apparatus provided in an embodiment of this application, refer to the implementations of the method.

Figure 8:
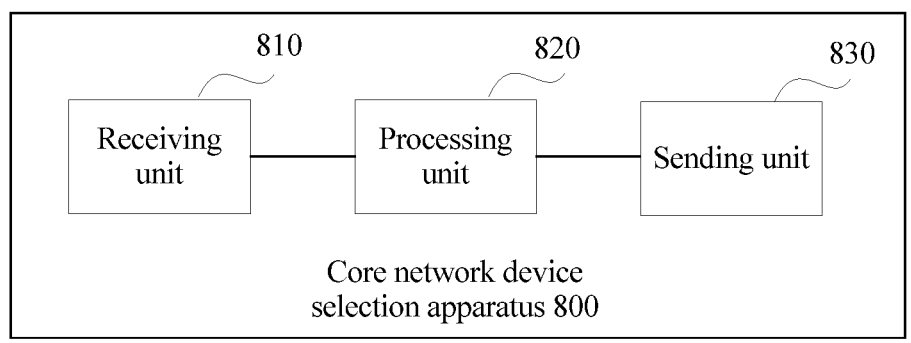
FIG. 8 is a schematic structural diagram of a core network device selection apparatus according to an embodiment of this application.

For example, as shown in FIG. 8, a core network device selection apparatus includes: a receiving unit 810, configured to receive a radio resource control access stratum message sent by a terminal, where the access stratum message includes a non-access stratum NAS request message and a network selection auxiliary parameter; a processing unit 820, configured to: query configuration information based on the network selection auxiliary parameter, and determine a group identifier of at least one mobility management device group, where the configuration information includes a correspondence between a network selection auxiliary parameter and a group identifier of a mobility management device group; and determine a device identifier of a target mobility management device based on the group identifier of the at least one mobility management device group; and a sending unit 830, configured to send the NAS request message to a mobility management device indicated by the device identifier of the target mobility management device.

In a possible design, the network selection auxiliary parameter includes a mobility management device type, and the configuration information includes a correspondence between a mobility management device type and a group identifier of a mobility management device group; and when querying the configuration information based on the network selection auxiliary parameter, and determining the group identifier of the at least one mobility management device group, the processing unit 820 is specifically configured to: query the correspondence between a mobility management device type and a group identifier of a mobility management device group based on the mobility management device type, and determine the group identifier of the at least one mobility management device group.

In a possible design, the network selection auxiliary parameter includes at least one slice type, and the configuration information includes a correspondence between a slice type and a group identifier of a mobility management device group; and when querying the configuration information based on the network selection auxiliary parameter, and determining the group identifier of the at least one mobility management device group, the processing unit 820 is specifically configured to: query the correspondence between a slice type and a group identifier of a mobility management device group based on the at least one slice type, and determine the group identifier of the at least one mobility management device group.

In a possible design, the network selection auxiliary parameter includes a mobility management device type and at least one slice type; the configuration information includes a correspondence among a mobility management device type, a slice type, and a group identifier of a mobility management device group; the configuration information further includes indication information, and the indication information indicates that the access network node queries the configuration information based on the network selection auxiliary parameter indicated by the indication information; and when querying the configuration information based on the network selection auxiliary parameter, and determining the group identifier of the at least one mobility management device group, the processing unit 820 is specifically configured to: when the indication information indicates the mobility management device type included in the network selection auxiliary parameter, query a correspondence between a mobility management device type and a group identifier of a mobility management device group based on the mobility management device type, and determine the group identifier of the at least one mobility management device group; or when the indication information indicates the at least one slice type included in the network selection auxiliary parameter, query a correspondence between a slice type and a group identifier of a mobility management device group based on the at least one slice type, and determine the group identifier of the at least one mobility management device group; or when the indication information indicates the mobility management device type and the at least one slice type that are included in the network selection auxiliary parameter, query a correspondence between a mobility management device type and a group identifier of a mobility management device group based on the mobility management device type, and determine a group identifier of at least one mobility management device group as a first group identifier group; query a correspondence between a slice type and a group identifier of a mobility management device group based on the at least one slice type, and determine a group identifier of at least one mobility management device group as a second group identifier group; and determine the group identifier of the at least one mobility management device group based on an intersection set or a union set of the first group identifier group and the second group identifier group.

In a possible design, the network selection auxiliary parameter includes a mobility management device type and at least one slice type; the configuration information includes a correspondence among a mobility management device type, a slice type, and a group identifier of a mobility management device group; and when querying the configuration information based on the network selection auxiliary parameter, and determining the group identifier of the at least one mobility management device group, the processing unit 820 is specifically configured to: query a correspondence between a mobility management device type and a group identifier of a mobility management device group based on the mobility management device type, and determine a group identifier of at least one mobility management device group as a first group identifier group; query a correspondence between a slice type and a group identifier of a mobility management device group based on the at least one slice type, and determine a group identifier of at least one mobility management device group as a second group identifier group; and determine the group identifier of the at least one mobility management device group based on an intersection set or a union set of the first group identifier group and the second group identifier group; or when querying a correspondence between a mobility management device type and a group identifier of a mobility management device group based on the mobility management device type, and determining a group identifier of at least one mobility management device group as a first group identifier group, skip querying a correspondence between a slice type and a group identifier of a mobility management device group based on the at least one slice type, and use a group identifier of at least one mobility management device group included in the first group identifier group as the finally determined group identifier of the at least one mobility management device group.

In a possible design, the at least one slice type includes a default slice type, and the default slice type is designated by the terminal or is set in a network configuration; and when querying the correspondence between a slice type and a group identifier of a mobility management device group based on the at least one slice type, and determining the group identifier of the at least one mobility management device group, the processing unit 820 is specifically configured to: query the correspondence between a slice type and a group identifier of a mobility management device group based on the default slice type, and determine the group identifier of the at least one mobility management device group.

In a possible design, the configuration information is sent by each mobility management device to the apparatus, or is configured by a network management device for the apparatus.

In a possible design, when determining the device identifier of the target mobility management device based on the group identifier of the at least one mobility management device, the processing unit 820 is specifically configured to: select a target mobility management device group from the at least one mobility management device group; and execute a NAS node selection function on each mobility management device in the target mobility management device group, and determine the device identifier of the target mobility management device.

In a possible design, the configuration information further includes weight information of each mobility management device group corresponding to a mobility management device type; and when selecting the target mobility management device group from the at least one mobility management device group, the processing unit 820 is specifically configured to: select the target mobility management device group from the at least one mobility management device group based on the weight information of each mobility management device group, of the at least one mobility management device group, corresponding to the mobility management device type.

In a possible design, the configuration information further includes weight information of each mobility management device group corresponding to a slice type; the at least one slice type includes a default slice type, and the default slice type is designated by the terminal or is set in a network configuration; and when selecting the target mobility management device group from the at least one mobility management device group, the processing unit 820 is specifically configured to: select the target mobility management device group from the at least one mobility management device group based on weight information of each mobility management device group, of the at least one mobility management device group, corresponding to the default slice type.

It should be understood that specific division of the units is merely an example, and is not intended to limit this application.

Based on a same concept, this application further provides an access network node. The access network node may be configured to perform the steps performed by the access network node in FIG. 3. Therefore, for implementations of the access network node provided in an embodiment of this application, refer to the implementations of the method. Repeated content is not described again.

Figure 9:
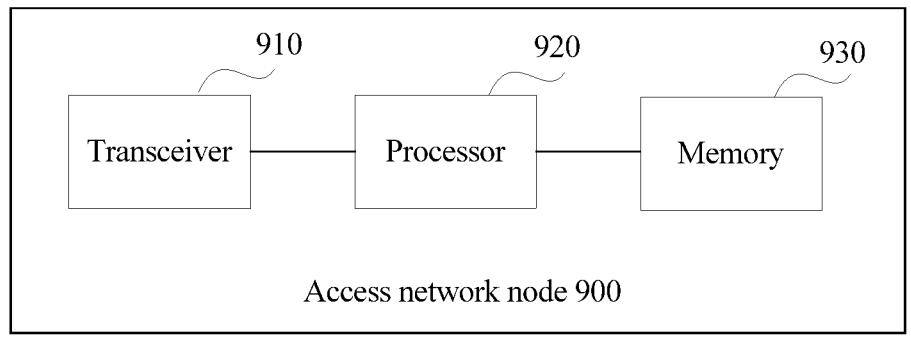
FIG. 9 is a schematic structural diagram of an access network node according to an embodiment of this application.

As shown in FIG. 9, an embodiment of this application provides an access network node 900. The access network node includes a transceiver 910, a processor 920, and a memory 9300. The transceiver 910, the processor 920, and the memory 930 may be connected by using a bus system. The memory 930 is configured to store a program, an instruction, or code. The processor 920 is configured to execute the program, the instruction, or the code in the memory 930, to specifically: receive, by using the transceiver 910, a radio resource control access stratum message sent by a terminal, where the access stratum message includes a non-access stratum NAS request message and a network selection auxiliary parameter; query configuration information based on the network selection auxiliary parameter, and determine a group identifier of at least one mobility management device group, where the configuration information includes a correspondence between a network selection auxiliary parameter and a group identifier of a mobility management device group; determine a device identifier of a target mobility management device based on the group identifier of the at least one mobility management device group; and send, by using the transceiver 910, the NAS request message to a mobility management device indicated by the device identifier of the target mobility management device.

It should be noted that, in a specific implementation, the functions of the receiving unit 810 and the sending unit 830 in FIG. 8 may be implemented by using the transceiver 910 in FIG. 9, and the functions of the processing unit 820 in FIG. 8 may be implemented by using the processor 920 in FIG. 9.

Therefore, based on the method provided in the embodiments of this application, a redirection process can be effectively avoided, so that signaling interaction between network devices is reduced, and a network access delay of the terminal is reduced. Particularly, when matching is performed only for a type of MMF or a type of SMF, a matching success rate is relatively high, and the access network node may relatively easily select a mobility management device for the terminal, but may not fully meet an access requirement of the terminal. When matching is performed for the type of MMF and the type of SMF, a matching success rate is relatively low, and the access network node may not select a mobility management device meeting a condition for the terminal. In this case, the access network node may set a default mobility management device, or select a group identifier of a mobility management device group from the first group identifier group or the second group identifier group.

In addition, in the prior art, the terminal may access only one core network slice instance, and a requirement and a capability of some complex terminals for further accessing a plurality of core network slice instances cannot be met. Based on the method provided in the embodiments of this application, a scenario in which the terminal accesses a plurality of core network slice instances can be supported.

All or some of the foregoing embodiments may be implemented by using of software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedures or functions according to the embodiments of the present invention are all or partially generated. The computer may be a general-purpose computer, a dedicated computer, a computer network, or other programmable apparatuses. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (such as a floppy disk, a hard disk, or a magnetic tape), an optical medium (for example, a DVD), a semiconductor medium (for example, a solid state disk (SSD)), or the like.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Apparently, a person skilled in the art can make various modifications and variations to the embodiments of this application without departing from the spirit and scope of this application. This application is intended to cover these modifications and variations provided that they fall within the scope of protection defined by the following claims and their equivalent technologies.

What is claimed is:

1. A method, comprising:
    receiving, by an access network node, a radio resource control access stratum message sent by a terminal, wherein the access stratum message comprises a non-access stratum (NAS) request message and a network selection auxiliary parameter;
    querying, by the access network node, configuration information based on the network selection auxiliary parameter, and determining a group identifier of each mobility management device group of at least one mobility management device group, wherein the configuration information comprises a correspondence between the network selection auxiliary parameter and the group identifier of each mobility management device group of the at least one mobility management device group, and the configuration information further comprises weight information of each mobility management device group of the at least one mobility management device group;
    determining, by the access network node, a device identifier of a target mobility management device based on the group identifier of each mobility management device group of the at least one mobility management device group; and
    sending, by the access network node, the NAS request message to the target mobility management device indicated by the device identifier of the target mobility management device.

2. The method according to claim 1, wherein the network selection auxiliary parameter comprises a mobility management device type, and the configuration information comprises a correspondence between the mobility management device type and the group identifier of each mobility management device group of the at least one mobility management device group; and
    wherein querying, by the access network node, the configuration information based on the network selection auxiliary parameter, and determining the group identifier of each mobility management device group of the at least one mobility management device group comprises:
    querying, by the access network node, the correspondence between the mobility management device type and the group identifier of each mobility management device group of the at least one mobility management device group based on the mobility management device type, and determining the group identifier of each mobility management device group of the at least one mobility management device group.

3. The method according to claim 1, wherein the network selection auxiliary parameter comprises a slice type, and the configuration information comprises a correspondence between the slice type and the group identifier of each mobility management device group of the at least one mobility management device group; and
    wherein querying, by the access network node, the configuration information based on the network selection auxiliary parameter, and determining the group identifier of each mobility management device group of the at least one mobility management device group comprises:
    querying, by the access network node, the correspondence between the slice type and the group identifier of each mobility management device group of the at least one mobility management device group based on the slice type, and determining the group identifier of each mobility management device group of the at least one mobility management device group.

4. The method according to claim 3, wherein the slice type comprises a default slice type, and the default slice type is designated by the terminal or is set in a network configuration; and wherein querying, by the access network node, the correspondence between the slice type and the group identifier of each mobility management device group of the at least one mobility management device group based on the slice type, and determining the group identifier of each mobility management device group of the at least one mobility management device group, comprises:

querying, by the access network node, the correspondence between the slice type and the group identifier of each mobility management device group of the at least one mobility management device group based on the default slice type, and determining the group identifier of each mobility management device group of the at least one mobility management device group.

5. The method according to claim 1, wherein:

the network selection auxiliary parameter comprises a mobility management device type and a slice type;

the configuration information comprises a correspondence among the mobility management device type, the slice type, and the group identifier of each mobility management device group of the at least one mobility management device group;

the configuration information further comprises indication information, and the indication information indicates that the access network node selects a mobility management device group based on the network selection auxiliary parameter; and querying, by the access network node, the configuration information based on the network selection auxiliary parameter, and determining the group identifier of each mobility management device group of the at least one mobility management device group, comprises:

when the indication information indicates that the access network node selects a mobility management device group based on the mobility management device type in the network selection auxiliary parameter, querying, by the access network node, a correspondence between the mobility management device type and the group identifier of each mobility management device group of the at least one mobility management device group based on the mobility management device type, and determining the group identifier of each mobility management device group of the at least one mobility management device group; or when the indication information indicates that the access network node selects a mobility management device group based on the slice type in the network selection auxiliary parameter, querying, by the access network node, a correspondence between the slice type and the group identifier of each mobility management device group of the at least one mobility management device group based on the slice type, and determining the group identifier of each mobility management device group of the at least one mobility management device group; or when the indication information indicates that the access network node selects a mobility management device group based on the mobility management device type and the slice type that are comprised in the network selection auxiliary parameter, performing the following:

querying, by the access network node, a correspondence between the mobility management device type and a group identifier of at least one first mobility management device group based on the mobility management device type, and determining the group identifier of the at least one first mobility management device group to be a first group identifier group;

querying, by the access network node, a correspondence between the slice type and a group identifier of at least one second mobility management device group based on the slice type, and determining the group identifier of the at least one second mobility management device group to be a second group identifier group; and determining, by the access network node, the group identifier of each mobility management device group of the at least one mobility management device group based on an intersection set or a union set of the first group identifier group and the second group identifier group.

6. The method according to claim 1, wherein:

the network selection auxiliary parameter comprises a mobility management device type and a slice type;

the configuration information comprises a correspondence among the mobility management device type, the slice type, and the group identifier of each mobility management device group of the at least one mobility management device group; and the querying, by the access network node, the configuration information based on the network selection auxiliary parameter, and determining the group identifier of each mobility management device group of the at least one mobility management device group, comprises:

querying, by the access network node, the correspondence between the mobility management device type and a group identifier of at least one first mobility management device group based on the mobility management device type, and determining the group identifier of the at least one first mobility management device group to be a first group identifier group; and performing the following:

querying, by the access network node, the correspondence between the slice type and a group identifier of at least one second mobility management device group based on the slice type, determining the group identifier of the at least one second mobility management device group to be a second group identifier group, and determining, by the access network node, the group identifier of each mobility management device group of the at least one mobility management device group based on an intersection set or a union set of the first group identifier group and the second group identifier group; or after querying the correspondence between the mobility management device type and the group identifier of the at least one first mobility management device group based on the mobility management device type, and determining the group identifier of the at least one first mobility management device group to be the first group identifier group, skipping, by the access network node, querying the correspondence between the slice type and the group identifier of the at least one second mobility management device group based on the slice type, and using a first group identifier comprised in the first group identifier group as the group identifier of each mobility management device group of the at least one mobility management device group.

7. The method according to claim 1, wherein the configuration information is sent by each mobility management device of the at least one mobility management device group to the access network node, or is configured by a network management device for the access network node.

8. The method according to claim 1, wherein determining, by the access network node, the device identifier of the target mobility management device based on the group identifier of each mobility management device group of the at least one mobility management device group comprises:
    selecting, by the access network node, a target mobility management device group from the at least one mobility management device group; and
    executing, by the access network node, a NAS node selection function on each mobility management device in the target mobility management device group, and determining the device identifier of the target mobility management device.

9. The method according to claim 8, wherein the configuration information comprises weight information of each mobility management device group corresponding to a mobility management device type; and
    wherein selecting, by the access network node, the target mobility management device group from the at least one mobility management device group comprises:
        selecting, by the access network node, the target mobility management device group from the at least one mobility management device group based on the weight information of each mobility management device group of the at least one mobility management device group that corresponds to the mobility management device type.

10. The method according to claim 8, wherein the configuration information comprises weight information of each mobility management device group corresponding to a slice type;
    wherein the slice type comprises a default slice type, and the default slice type is designated by the terminal or is set in a network configuration; and
    wherein selecting, by the access network node, the target mobility management device group from the at least one mobility management device group comprises:
        selecting, by the access network node, the target mobility management device group from the at least one mobility management device group based on weight information of each mobility management device group of the at least one mobility management device group that corresponds to the default slice type.

11. An apparatus, comprising:
    a receiver, configured to receive a radio resource control access stratum message sent by a terminal, wherein the access stratum message comprises a non-access stratum (NAS) request message and a network selection auxiliary parameter;
    a processor; and
    a non-transitory computer-readable storage medium storing a program to be executed by the processor, the program including instructions for:
        querying configuration information based on the network selection auxiliary parameter, and determining a group identifier of each mobility management device group of at least one mobility management device group, wherein the configuration information comprises a correspondence between the network selection auxiliary parameter and the group identifier of each mobility management device group of the at least one mobility management device group, and the configuration information further comprises weight information of each mobility management device group of the at least one mobility management device group; and
        determining a device identifier of a target mobility management device based on the group identifier of each mobility management device group of the at least one mobility management device group; and
        sending the NAS request message to the target mobility management device indicated by the device identifier of the target mobility management device.

12. The apparatus according to claim 11, wherein the network selection auxiliary parameter comprises a mobility management device type, and the configuration information comprises a correspondence between the mobility management device type and the group identifier of each mobility management device group of the at least one mobility management device group; and
    wherein the instructions for querying the configuration information based on the network selection auxiliary parameter, and determining the group identifier of each mobility management device group of the at least one mobility management device group, comprises instructions for:
        querying the correspondence between the mobility management device type and the group identifier of each mobility management device group of the at least one mobility management device group based on the mobility management device type, and determining the group identifier of each mobility management device group of the at least one mobility management device group.

13. The apparatus according to claim 11, wherein the network selection auxiliary parameter comprises a slice type, and the configuration information comprises a correspondence between the slice type and the group identifier of each mobility management device group of the at least one mobility management device group; and
    the instructions for querying the configuration information based on the network selection auxiliary parameter, and determining the group identifier of each mobility management device group of the at least one mobility management device group, comprise instructions for:
        querying the correspondence between the slice type and the group identifier of each mobility management device group of the at least one mobility management device group based on the slice type, and determining the group identifier of each mobility management device group of the at least one mobility management device group.

14. The apparatus according to claim 13, wherein the slice type comprises a default slice type, and the default slice type is designated by the terminal or is set in a network configuration; and
    the instructions for querying the correspondence between the slice type and the group identifier of each mobility management device group of the at least one mobility management device group based on the slice type, and determining the group identifier of each mobility management device group of the at least one mobility management device group, comprise instructions for:
querying the correspondence between the slice type and the group identifier of each mobility management device group of the at least one mobility management device group based on the default slice type, and determining the group identifier of each mobility management device group of the at least one mobility management device group.

15. The apparatus according to claim 11, wherein:
the network selection auxiliary parameter comprises a mobility management device type and a slice type;
the configuration information comprises a correspondence among the mobility management device type, the slice type, and the group identifier of each mobility management device group of the at least one mobility management device group;
the configuration information further comprises indication information, and the indication information indicates that the apparatus selects a mobility management device group based on the network selection auxiliary parameter; and
the instructions for querying the configuration information based on the network selection auxiliary parameter, and determining the group identifier of each mobility management device group of the at least one mobility management device group, comprise instructions for:
when the indication information indicates that the apparatus selects a mobility management device group based on the mobility management device type in the network selection auxiliary parameter, querying a correspondence between a mobility management device type and the group identifier of each mobility management device group of the at least one mobility management device group based on the mobility management device type, and determine the group identifier of each mobility management device group of the at least one mobility management device group; or
when the indication information indicates that the apparatus selects a mobility management device group based on the slice type in the network selection auxiliary parameter, querying a correspondence between the slice type and the group identifier of each mobility management device group of the at least one mobility management device group based on the slice type, and determining the group identifier of each mobility management device group of the at least one mobility management device group; or
when the indication information indicates that the apparatus selects a mobility management device group based on the mobility management device type and the slice type in the network selection auxiliary parameter, performing the following:
querying a correspondence between the mobility management device type and a group identifier of at least one first mobility management device group based on the mobility management device type, and determining a group identifier of the at least one first mobility management device group to be a first group identifier group;
querying a correspondence between the slice type and a group identifier of at least one second mobility management device group based on the slice type, and determining a group identifier of the at least one second mobility management device group to be a second group identifier group; and
determining the group identifier of each mobility management device group of the at least one mobility management device group based on an intersection set or a union set of the first group identifier group and the second group identifier group.

16. The apparatus according to claim 11, wherein:
the network selection auxiliary parameter comprises a mobility management device type and a slice type;
the configuration information comprises a correspondence among the mobility management device type, the slice type, and the group identifier of each mobility management device group of the at least one mobility management device group; and
the instructions for querying the configuration information based on the network selection auxiliary parameter, and determining the group identifier of each mobility management device group of the at least one mobility management device group, comprise instructions for:
querying a correspondence between the mobility management device type and a group identifier of at least one first mobility management device group based on the mobility management device type, and determining a group identifier of the at least one first mobility management device group to be a first group identifier group; and
performing the following:
querying a correspondence between the slice type and a group identifier of at least one second mobility management device group based on the slice type, determining a group identifier of the at least one second mobility management device group to be a second group identifier group, and determine the group identifier of each mobility management device group of the at least one mobility management device group based on an intersection set or a union set of the first group identifier group and the second group identifier group; or
after querying the correspondence between the mobility management device type and the group identifier of the at least one first mobility management device group based on the mobility management device type, and determining the group identifier of the at least one first mobility management device group to be the first group identifier group, skipping querying the correspondence between the slice type and the group identifier of the at least one second mobility management device group based on the slice type, and using the group identifier of the at least one second mobility management device group comprised in the first group identifier group as the group identifier of each mobility management device group of the at least one mobility management device group.

17. The apparatus according to claim 11, wherein the configuration information is sent by each mobility management device of the at least one mobility management device group to the apparatus, or is configured by a network management device for the apparatus.

18. The apparatus according to claim 11, wherein the instructions for determining the device identifier of the target mobility management device based on the group identifier of the at least one mobility management device comprise instructions for:
- selecting a target mobility management device group from the at least one mobility management device group; and
- executing a NAS node selection function on each mobility management device in the target mobility management device group, and determining the device identifier of the target mobility management device.

19. The apparatus according to claim 18, wherein the configuration information comprises weight information of each mobility management device group corresponding to a mobility management device type; and
- wherein the instructions for selecting the target mobility management device group from the at least one mobility management device group comprise instructions for:
  - selecting the target mobility management device group from the at least one mobility management device group based on the weight information of each mobility management device group of the at least one mobility management device group that corresponds to the mobility management device type.

20. The apparatus according to claim 18, wherein:
the configuration information comprises weight information of each mobility management device group corresponding to a slice type;
the slice type comprises a default slice type, and the default slice type is designated by the terminal or is set in a network configuration; and
the instructions for selecting the target mobility management device group from the at least one mobility management device group comprise instructions for:
- selecting the target mobility management device group from the at least one mobility management device group based on weight information of each mobility management device group of the at least one mobility management device group that corresponds to the default slice type.

* * * * *